US 8,864,448 B2

(12) United States Patent
Taneja et al.

(10) Patent No.: US 8,864,448 B2
(45) Date of Patent: Oct. 21, 2014

(54) RAM AIR TURBINE WITH INTEGRATED HEAT EXCHANGER

(75) Inventors: Dinesh Nath Taneja, Vandalia, OH (US); John Andrew Layer, East Aurora, NY (US)

(73) Assignee: General Electric Company, Schenectady, NY (US)

( * ) Notice: Subject to any disclaimer, the term of this patent is extended or adjusted under 35 U.S.C. 154(b) by 493 days.

(21) Appl. No.: 13/238,880

(22) Filed: Sep. 21, 2011

(65) Prior Publication Data

US 2013/0071232 A1    Mar. 21, 2013

(51) Int. Cl.
*F01D 15/12* (2006.01)
*B64D 41/00* (2006.01)
*F03D 9/00* (2006.01)

(52) U.S. Cl.
CPC .............. *B64D 41/007* (2013.01); *Y02T 50/44* (2013.01); *F03D 9/00* (2013.01); *Y02E 10/722* (2013.01); *F05B 2220/31* (2013.01)
USPC ...... 415/122.1; 415/175; 415/177; 416/170 R; 290/1 B; 310/64

(58) Field of Classification Search
USPC ................. 416/95, 170 R; 415/122.1, 124.1, 415/175–178, 180; 310/83, 54, 64; 290/1 B, 290/54
See application file for complete search history.

(56) References Cited

U.S. PATENT DOCUMENTS

| 2,761,984 | A | * | 9/1956 | Ludwig et al. .................. 310/64 |
| 6,580,179 | B2 | | 6/2003 | Eccles et al. |
| 7,019,415 | B2 | | 3/2006 | Ganev et al. |
| 7,394,175 | B2 | | 7/2008 | McAuliffe et al. |
| 7,445,102 | B2 | | 11/2008 | Lane et al. |
| 7,708,527 | B2 | | 5/2010 | Eccles et al. |
| 2003/0108426 | A1 | | 6/2003 | Eccles et al. |
| 2005/0129517 | A1 | * | 6/2005 | Eccles et al. .............. 416/170 R |
| 2008/0231126 | A1 | * | 9/2008 | Telore et al. .................... 310/59 |

FOREIGN PATENT DOCUMENTS

| EP | 2357133 A1 | 8/2011 |
| WO | 02/098736 A1 | 12/2002 |

OTHER PUBLICATIONS

Search Report and Written Opinion from corresponding EP Application No. 12184550.7 dated Jan. 21, 2013.

* cited by examiner

*Primary Examiner* — Edward Look
*Assistant Examiner* — Danielle M Christensen
(74) *Attorney, Agent, or Firm* — McGarry Bair PC

(57) ABSTRACT

A ram air turbine system for generating electrical power in an aircraft when the system is exposed to an airstream exterior of the aircraft. The ram air turbine system includes a turbine, a housing defining an interior, a gearbox having a speed-increasing gear train, and a generator.

11 Claims, 4 Drawing Sheets

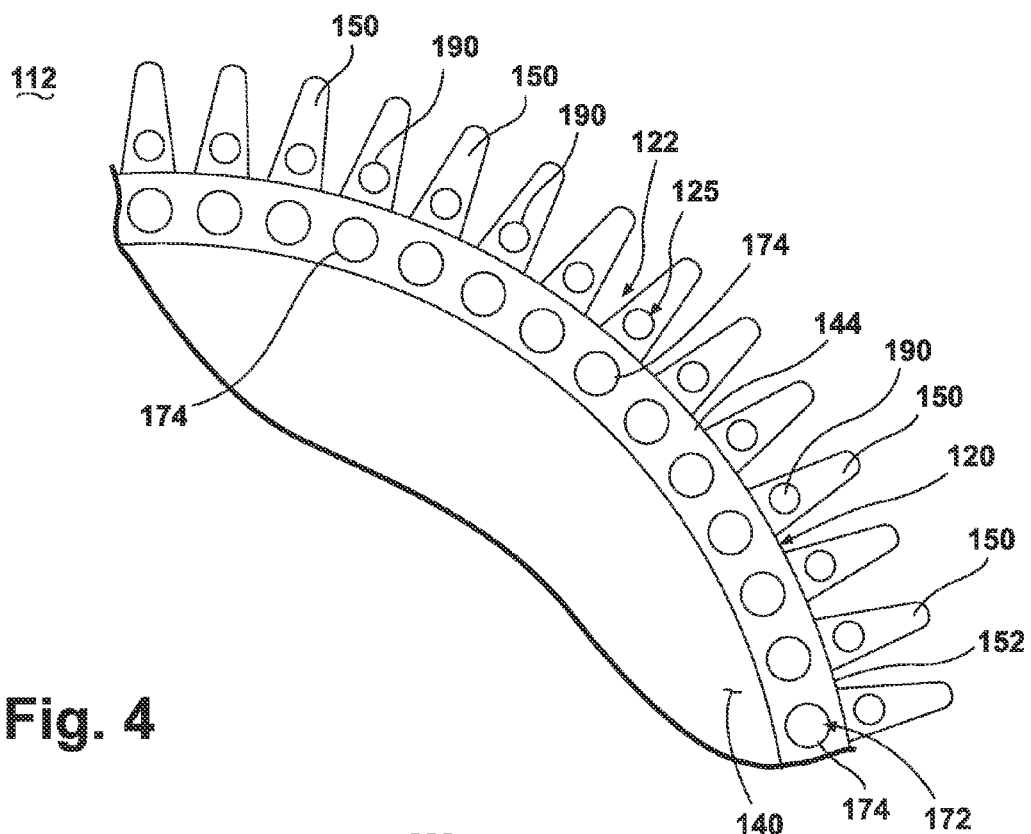
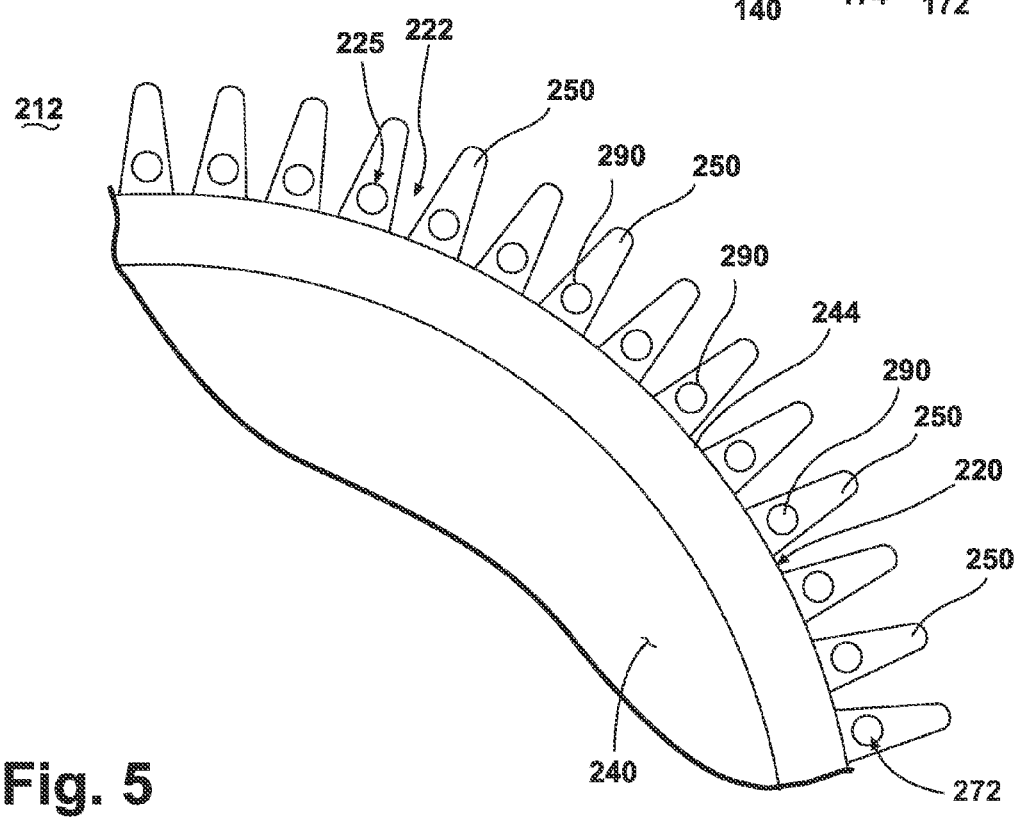

RAM AIR TURBINE WITH INTEGRATED HEAT EXCHANGER

BACKGROUND OF THE INVENTION

Ram Air Turbine (RAT) systems are used in contemporary aircraft as emergency or supplemental power systems. They typically have a turbine, with a rotating hub and a plurality of blades, operably coupled to a generator to provide the driving source for the generator. Initially in flight they are stowed in a compartment of the aircraft fuselage, covered by a compartment door. When needed as a source of emergency or supplemental power, the RAT system is deployed from the fuselage into the surrounding airstream, which drives the blades to rotate the generator to extract energy from the airstream.

As power requirements for aircraft systems increase, the power generation capabilities of RAT systems continue to increase. Higher power generators tend to be configured to rotate at speeds greater than the rotational speed of the turbine by utilizing a gearbox between the turbine and the generator. The higher power generators, including the gearbox, tend to generate sufficient heat to make it impossible to cool solely by the airstream and use liquid cooling systems, including a heat exchanger, which projects into the airstream.

BRIEF DESCRIPTION OF THE INVENTION

In one embodiment, a ram air turbine system, for generating electrical power in an aircraft when the system is exposed to an airstream exterior of the aircraft, includes a turbine having multiple blades and a turbine output shaft operably coupled to the blades such that rotation of the blades rotates the turbine output shaft, a housing defining an interior, a gearbox located in the interior and having a speed-increasing gear train with a gearbox output element and operably coupled to the turbine output shaft such that the gearbox output element rotates at a faster speed than the blades, a generator located within the interior and having a stator and a rotor where the rotor is operably coupled to the gearbox output element, and an integrated heat exchanger for cooling the gearbox and the generator.

BRIEF DESCRIPTION OF THE DRAWINGS

In the drawings:

FIG. 4 is a schematic cross sectional view of a portion of a ram air turbine with an integrated heat exchanger according to a second embodiment of the invention; and FIG. 5 is a schematic cross sectional view of a portion of a ram air turbine with an integrated heat exchanger according to a third embodiment of the invention.

DESCRIPTION OF EMBODIMENTS OF THE INVENTION

Figure 1:
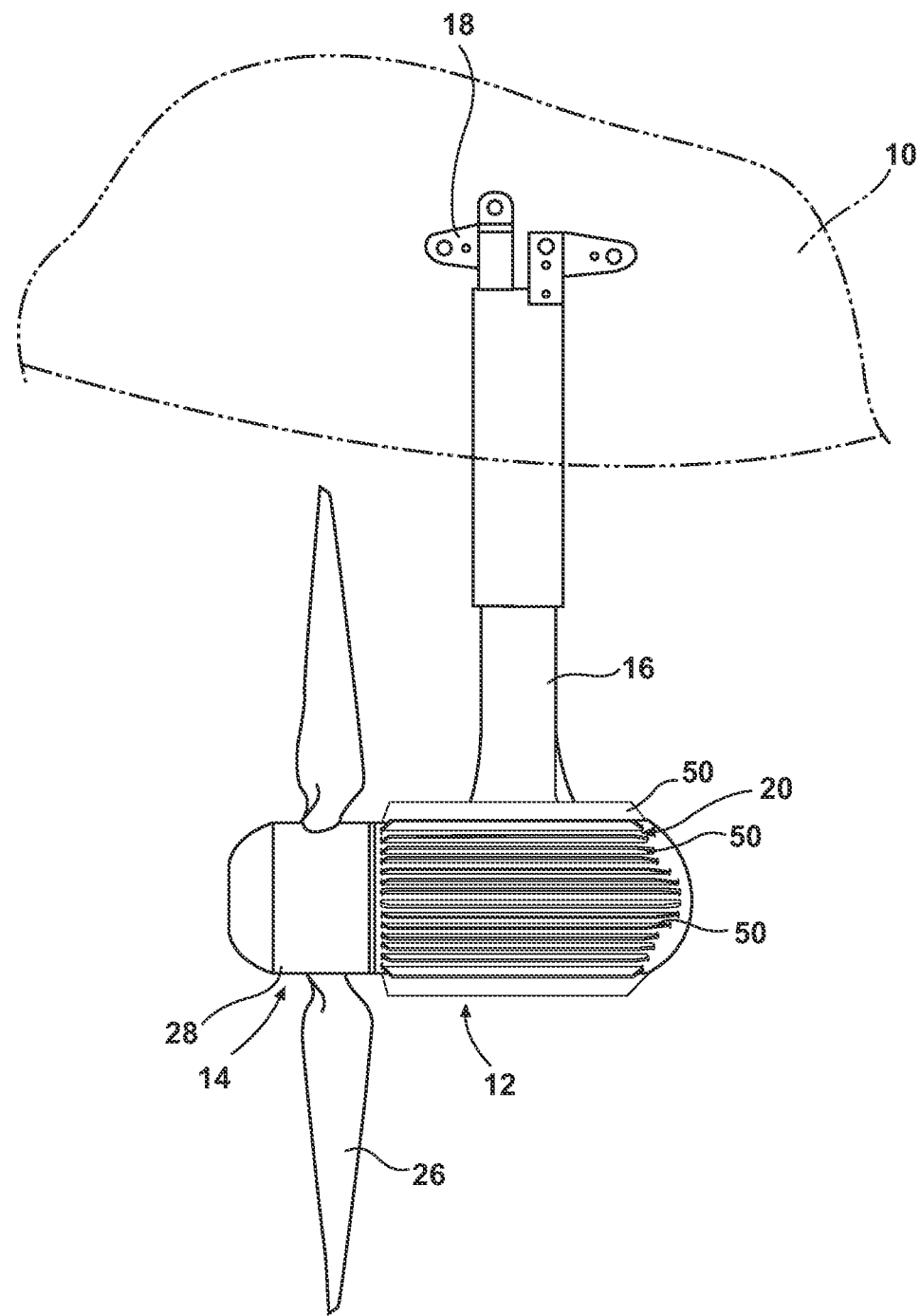
FIG. 1 is a side view illustrating a portion of an aircraft having a ram air turbine with integrated heat exchanger in accordance with one embodiment of the invention.
Figure 2:
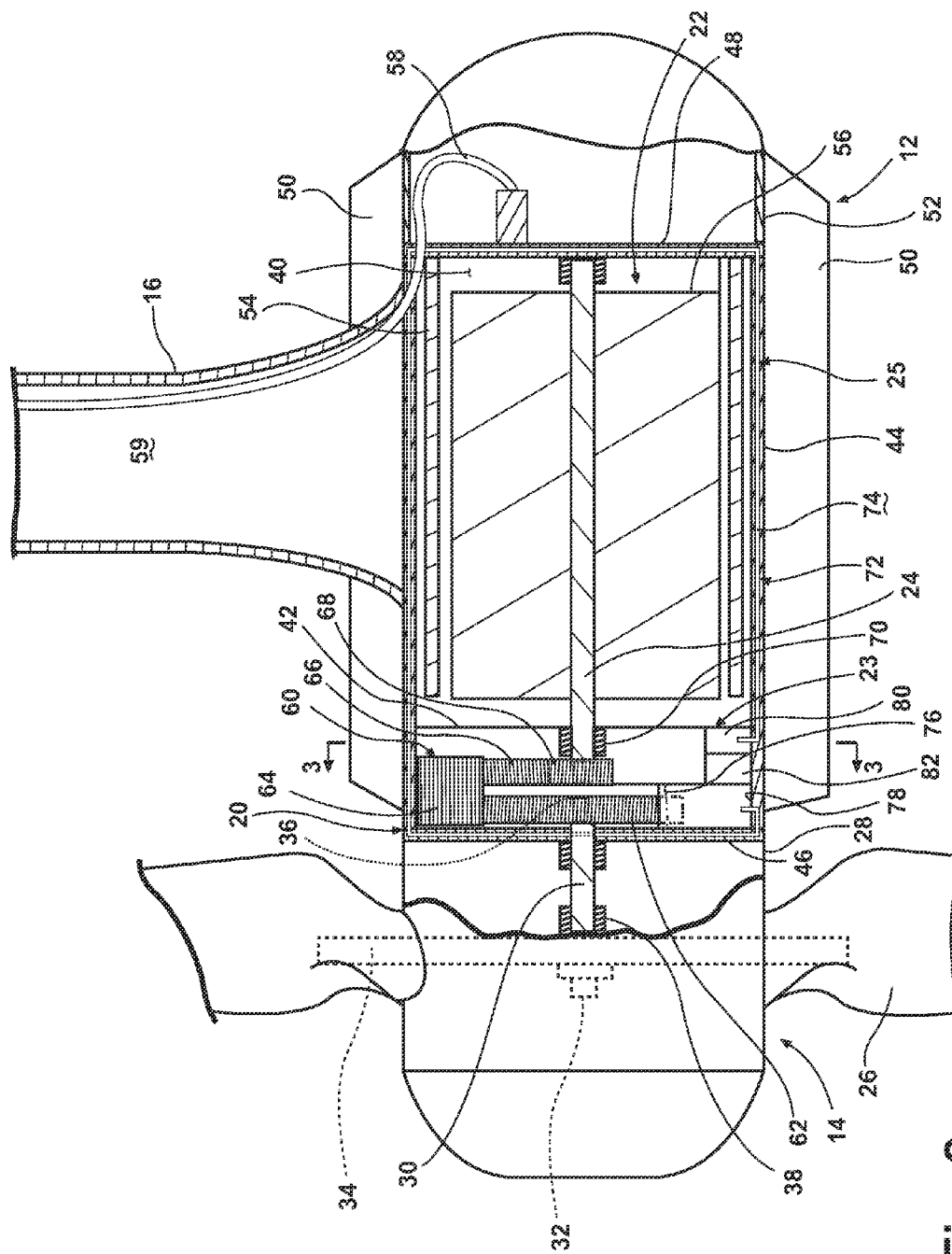
FIG. 2 is a schematic cross sectional view of the ram air turbine and integrated heat exchanger of FIG. 1.

As illustrated in FIG. 1, an aircraft 10 may include a RAT system 12 for generating electrical power for the aircraft 10 when the RAT system 12 is exposed to the airstream exterior of the aircraft 10. The RAT system 12 may include a RAT 14, which may be suspended from the aircraft 10 by a strut 16 and mounting assembly 18. The RAT 14 may be stored within a suitable compartment in the fuselage or wing of the aircraft 10 and may be deployed quickly and easily by moving the strut 16 relative to the mounting assembly 18, thereby moving the RAT system 12 to an exposed position within the air stream flowing past the aircraft 10. As illustrated in FIG. 2, the RAT 14 includes a housing 20 in which are located an electrical generator 22, a gearbox 23 having a gearbox output element 24, and an integrated heat exchanger 25. A turbine in the form of multiple blades 26 projecting from a rotary hub 28 is provided on one end of the housing 20. Although only two blades 26 have been shown in the illustrated embodiment it is contemplated that any number of blades 26 may be used. The turbine further includes a turbine output shaft 30 may be operably coupled at a first end 32 to the blades 26 such that rotation of the blades 26 rotates the turbine output shaft 30. The turbine output shaft 30 may be operably coupled to the blades 26 in any suitable manner and may project rearwardly from the blades 26 to provide a rotary output for driving an auxiliary power unit, such as the electrical generator 22. By way of non-limiting example, a rotor shaft 34 may extend from the blades 26 and may be splined, or otherwise suitably mechanically coupled, with the turbine output shaft 30 such that rotation of the blades 26 is transferred through the rotor shaft 34 to the turbine output shaft 30. Alternatively, the blades 26 or a portion of the rotary hub 28 may be coupled directly to the turbine output shaft 30. A second end 36 of the turbine output shaft 30 may be operably coupled to a portion of the gearbox 23. The turbine output shaft 30 may be rotatably supported within bearings 38 mounted in the rotary hub 28.

The housing 20, as illustrated, comprises a body 44, which is closed by opposing first and second end caps 46, 48, to provide a common housing defining an interior 40 for receiving both the gearbox 23 and generator 22. A wall 42 is provided to separate the gearbox portion of the interior 40 from the generator portion of the interior 40 to physically and fluidly separate the two portions of the interior 40. The housing 20 may also include a plurality of heat-dissipating fins or cooling fins 50. The cooling fins 50 may be formed in any suitable manner such that they project outwardly from a periphery 52 the housing 20. The cooling fins 50 may be spaced about the periphery 52 of the body 44. The size and number of the cooling fins 50 may be a function of the specific heat dissipation requirements of the RAT system 12.

The generator 22 comprises a stator 54 and a rotor 56 located within the generator portion of the interior 40. The rotor 56 may be operably coupled to the gearbox output element 24 such that the gearbox output element 24 may provide driving force for the rotor 56 such that electrical power may be generated. The generator 22 may be suitably coupled via conductor cables 58 to the aircraft 10. As illustrated, the RAT system 12 may be carried at the lower end of strut 16, which may be hollow. The hollow strut 16 may define a passage 59 through which the conductor cables 58 from the generator 22 may pass to the aircraft 10. In this manner, the conductor cables 58, and any other linkages between the RAT system 12 and the aircraft 10, may be protectively concealed within the strut 16 to lessen damage.

The gearbox 23 may include a speed-increasing gear train 60. More specifically, an input gear 62, a first idler gear 64, a second idler gear 66, and an output drive gear 68 may be included in the speed-increasing gear train 60. The input gear 62 may be referred to by other names but has been referenced here as an input gear because power is input to the speed-increasing gear train 60 of the gearbox 23 at the input gear end of the speed-increasing gear train 60. The input gear 62 may be splined or otherwise suitably mechanically coupled to the turbine output shaft 30, generally near its second end 36. Input gear 62 meshes with the first idler gear 64, which has a height spanning across both the input gear 62 and the second idler gear 66. In this manner, the first idler gear 64 may mesh with the second idler gear 66. The second idler gear 66 may in turn mesh with the output drive gear 68, which may be splined, or otherwise suitably mechanically coupled, to the gearbox output element 24, which is illustrated as a shaft that may be rotatably supported by bearings 70. The bearings 70 may be provided in an arrangement to rotatably support the gearbox output element 24 coaxially with the turbine output shaft 30.

Other configurations for the gearbox 23, including the gear train 60 are possible. For example, although the gearbox 23 is illustrated as being located within the housing 20 with the generator 22 it may be in a separate housing coupled to the generator 22.

A coolant circuit 72 is included in the integrated heat exchanger 25 for cooling the gearbox 23 and the generator 22. The coolant circuit 72 is illustrated as extending from the gearbox 23 to the generator 22 and is formed at least in part by passageways 74 within the housing 20 such that heat from the gearbox 23 and the generator 22 is transferred to the housing 20 by a coolant 76 circulating in the coolant circuit 72. More specifically, the passageways 74 may be formed within the body 44 such that they extend a length of the body 44. The passageways 74 may be formed within the first and second end caps 46 and 48 such that they fluidly couple the passageways 74 within the body 44 to each other.

Figure 3:
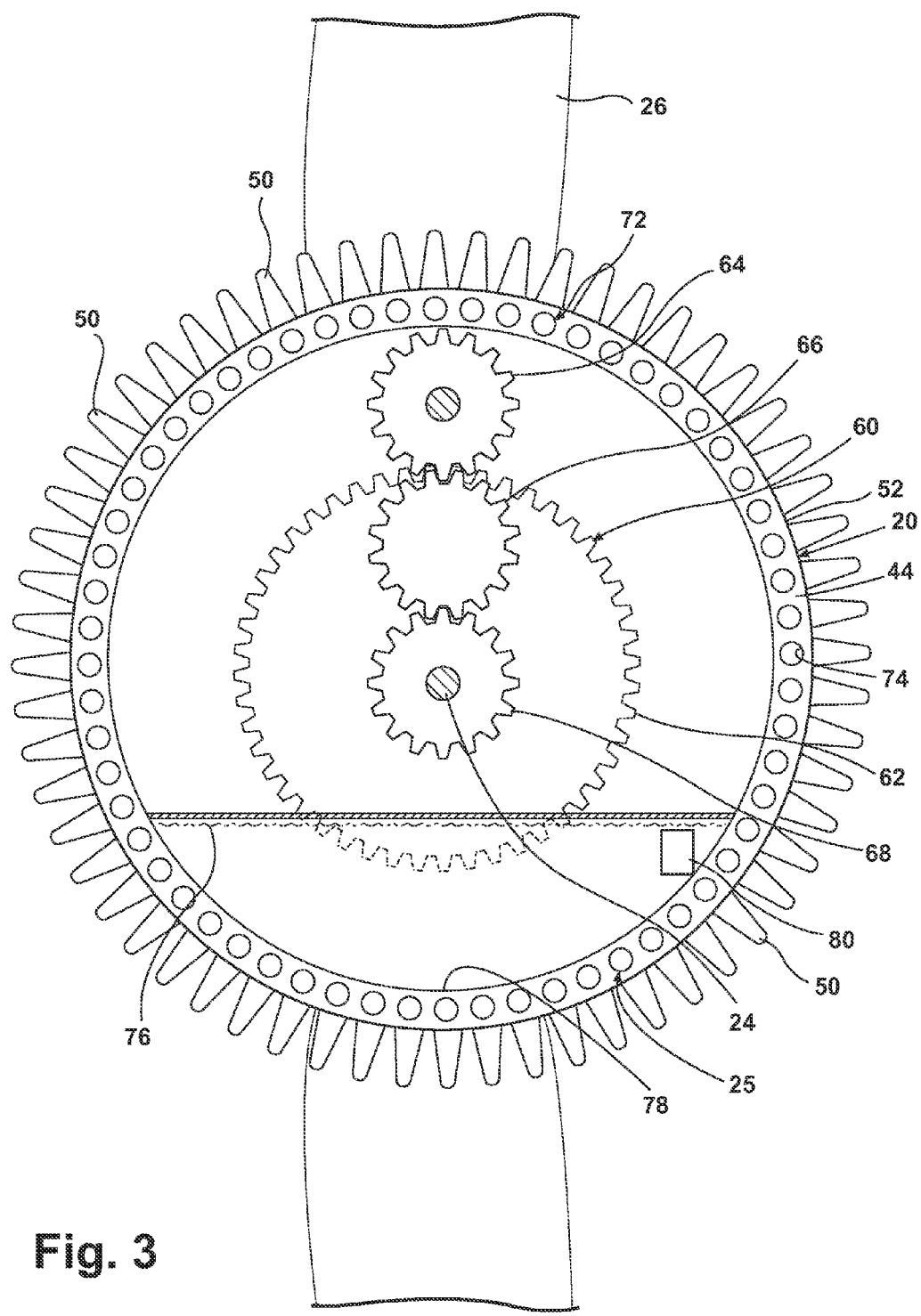
FIG. 3 is a schematic cross sectional view of the ram air turbine and integrated heat exchanger of FIG. 1.

A coolant sump 78 may be fluidly coupled to the coolant circuit 72 to supply coolant 76 to the coolant circuit 72. Any suitable coolant 76 may be used including, by way of non-limiting example, oil. A pump 80 may be fluidly coupled to at least one of the coolant sump 78 and the coolant circuit 72 to recirculate the coolant 76 from the coolant sump 78 through the coolant circuit 72. The pump 80 may be any suitable type of pump and by way of non-limiting examples may include a simple gear pump, or a gerotor type pump. It is contemplated that regardless of the type of pump used the pump 80 may be driven off of the speed-increasing gear train 60. A filter assembly 82 may also be located within the gear box 23 along the coolant circuit 72, preferably adjacent the pump 80 to filter the coolant 76 to prevent plugging of the coolant circuit 72. The coolant sump 78 and pump 80 are illustrated as being located within the gearbox 23. In this configuration, as better illustrated in FIG. 3, the input gear 62 may contact the coolant 76 within the coolant sump 78 such that the coolant 76 may be used as lubrication for the speed-increasing gear train 60.

During operation of the RAT system 12, the RAT 14 is extended into the airstream surrounding the aircraft, the airstream flowing over the blades 26 causes the blades 26 to rotate, which in turn causes the turbine output shaft 30 to rotate at the same rotations per minutes as the blades 26. The turbine output shaft 30 drives the input gear 62 of the speed-increasing gear train 60, which in turn drives the first and second idler gears 64 and 66, which in turn drives the output drive gear 68 and the gearbox output element 24. The speed-increasing gear train 60 causes the gearbox output element 24 to rotate at a faster speed than the blades 26 and acts to convert the low speed incoming rotation to high speed rotation suitable for generating electricity.

By way of non-limiting example the generator 22 may be configured to generate at least 30 kW at 20,000 rpm. More specifically, the ratio of the input gear 62 to the output drive gear 68 may be selected such that the output drive gear 68 rotates at a substantially greater speed than the input gear 62. The gear configuration and gear ratios in the speed-increasing gear train 60 may be selected such that the gearbox output element 24 rotates at 20,000 rpm in response to a predetermined rotational speed of the turbine output shaft of 6,000 rpm. The rotor 56 is driven by the gearbox output element 24 and causes the generator 22 to produce electricity that may be transferred to the aircraft 10 through the conductor cables 58.

Along with producing electricity, the RAT system 12 also produces heat. During operation the pump 80 may also be driven by the speed-increasing gear train 60 and may operate to circulate the coolant 76 within the cooling circuit 72. The coolant 76 may be pumped by the pump 80 through the coolant circuit 72 including the multiple passageways 74 within the body 44 and first and second end caps 46 and 48 before the coolant flows into the coolant sump 78 and through the filter assembly 82 before being pumped by the pump 80 through the coolant circuit 72 again. When the coolant flows through the coolant circuit 72 it may absorb heat from the gearbox 23 and interior 40 of the generator 22, which is hotter than the coolant. As the coolant 76 is pumped through the cooling circuit 72 it carries the displaced heat. The displaced heat in the coolant 76 may then be dissipated through the housing 20 and its cooling fins 50. The cooled coolant repeats this cycle, to continuously remove heat from the gearbox 23 and generator 22. The RAT 14, gearbox 23, and generator 22 are linearly arranged such that the airstream passing through the blades 26 flows over the gearbox 23 and the housing 20 including the cooling fins 50 to provide for heat transfer from the circulating coolant 76 to the airstream. The cooling fins 50 add to the surface area of the generator 22 and aid in transferring heat to the surrounding air stream allowing for greater heat dissipation from the RAT system 12.

Many other possible embodiments and configurations in addition to that shown in the above figures are contemplated by the present disclosure. For example, the speed-increasing gear train 60 may also provide the driving power for a hydraulic pump (not shown). Such a hydraulic pump may be located such that it may rotate at the same increased speed as the generator 22 or may be located such that it may rotate at the slower turbine speed while the electrical generator is allowed to rotate at the increased speed. Further, the design and placement of the various components may be rearranged such that a number of different in-line configurations could be realized.

Furthermore, FIG. 4 illustrates an alternative RAT system 112 with an integrated heat exchanger 125 according to a second embodiment of the invention. The second embodiment is similar to the first embodiment; therefore, like parts will be identified with like numerals increased by 100, with it being understood that the description of the like parts of the first embodiment applies to the second embodiment, unless otherwise noted. The difference between the first embodiment and the second embodiment is that the cooling fins 150 of the heat exchanger 125 also have passageways 190, which may be fluidly coupled to the passageways 174 and the remainder of the cooling circuit 172. Although each cooling fin 150 has been illustrated as having a passageway 190 this need not be the case. It is possible for some, but not all, of the cooling fins 150 to have a passageway 190. Further, with some of the passageways 190 being located in the cooling fins 150 the number of passageways in the housing 120 may be reduced. The coolant in both the passageways 174 and the passageways 190 may further aid in displacing heat from the gearbox 23 and generator 122 to the surrounding airstream.

FIG. 5 illustrates a third embodiment wherein the RAT system 212 only includes the passageways 290 located within the fins 250. The third embodiment is similar to the first embodiment; therefore, like parts will be identified with like numerals increased by 200, with it being understood that the description of the like parts of the first embodiment applies to the third embodiment, unless otherwise noted. In the case of the third embodiment the passageways 290 take the place of the passageways within the body 244. Thus, the first and second end caps (not shown) would include corresponding fluid passageways to allow coolant pumped through the passageways 290 to be in fluid communication with the remainder of the cooling circuit 272 including the coolant sump and pump (not shown).

The embodiments disclosed herein provide a RAT system with an integrated heat exchanger. One advantage that may be realized in the above embodiments is that the above described embodiments can effectively remove heat from the high power RAT system. The cooling fins along the housing increase the cooling surface area and the coolant circuit provides an effective means for dissipating heat from the gearbox and generator. Another advantage is that the above described embodiments are configured as closed loop systems where oil in the coolant sump is recirculated to remove heat from the generator while also providing lubrication to the gears in gearbox.

When designing aircraft components, important factors to address are size, weight, and reliability. The above described RAT systems have a decreased number of parts as there is not a separate heat exchanger or separate plumbing connections. This results in a lower weight, smaller sized, and increased reliability system. The lower number of parts and reduced maintenance will lead to a lower product costs and lower operating costs. Reduced weight and size correlate to competitive advantages during flight.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A ram air turbine system for generating electrical power in an aircraft when the system is exposed to an airstream exterior of the aircraft, the system comprising:
    a turbine having multiple blades and a turbine output shaft operably coupled to the blades such that rotation of the blades rotates the turbine output shaft;
    a housing having a body defining an interior;
    a gearbox located within the interior and having a speed-increasing gear train with a gearbox output element and operably coupled to the turbine output shaft such that the gearbox output element rotates at a faster speed than the blades;
    a generator located within the interior and having a stator and a rotor where the rotor operably couples to the gearbox output element; and
    heat exchanger integrated with the housing for cooling the gearbox and the generator, the heat exchanger having a coolant circuit extending from the gearbox to the generator and formed at least in part by passageways formed within the body such that heat from the gearbox and the generator is transferred to the housing by coolant circulating in the coolant circuit;
    wherein the turbine, gearbox, heat exchanger, and generator are linearly arranged such that the airstream passing through the blades flows over the gearbox, the heat exchanger, and the generator to provide for heat transfer from the circulating coolant to the airstream via the housing.

2. The ram air turbine system of claim 1 wherein the housing further comprises outwardly projecting cooling fins.

3. The ram air turbine system of claim 2 wherein at least some of the passageways are located in the cooling fins.

4. The ram air turbine system of claim 3 wherein the cooling fins are spaced about a periphery of the housing.

5. The ram air turbine system of claim 1 further comprising a coolant sump fluidly coupled to the coolant circuit to supply coolant to the coolant circuit.

6. The ram air turbine system of claim 5 further comprising a pump fluidly coupled to at least one of the coolant sump and the coolant circuit to recirculate coolant from the coolant sump through the coolant circuit.

7. The ram air turbine system of claim 6 wherein the sump and pump are located within the gearbox.

8. The ram air turbine system of claim 7 wherein the speed-increasing gear train drives the pump.

9. The ram air turbine system of claim 1 wherein the generator is configured to generate at least 30 kW at 20,000 rpm.

10. The ram air turbine system of claim 9 wherein the speed-increasing gear train is selected such that the output element rotates at 20,000 rpm in response to a predetermined rotational speed of the turbine output shaft.

11. The ram air turbine system of claim 10 wherein the predetermined rotational speed of the turbine output shaft is 6,000 rpm.

* * * * *